Figure 1:
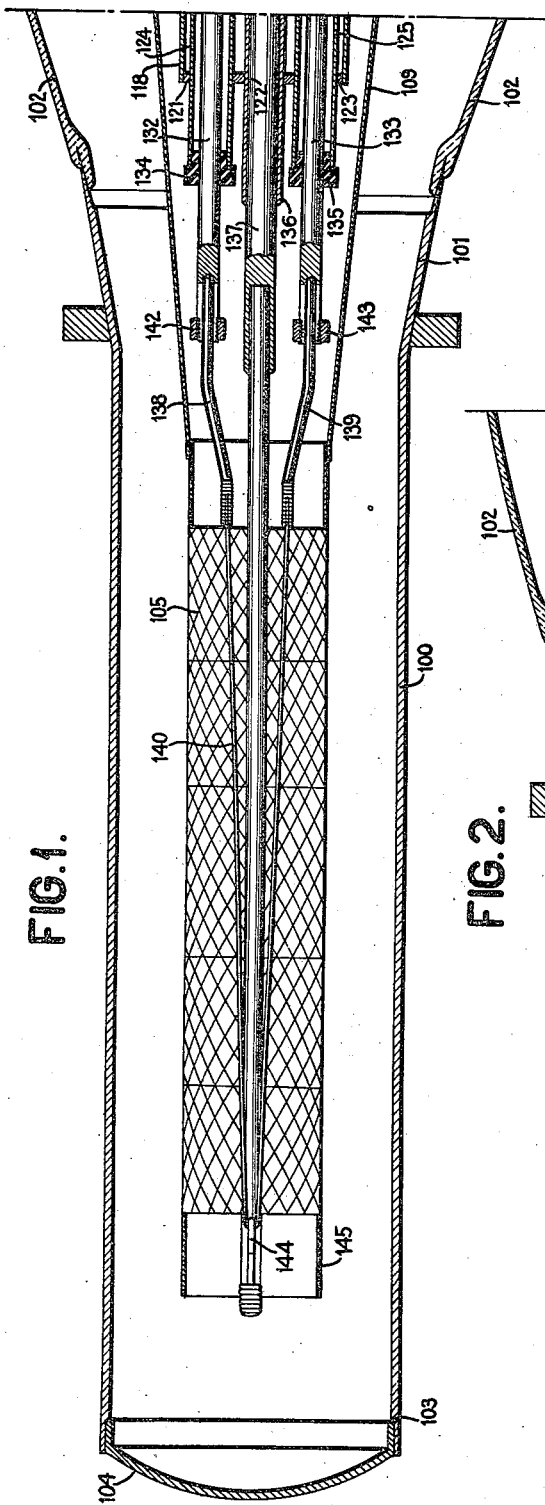

Jan. 28, 1941.　　　C. V. LITTON　　　2,229,751
DEMOUNTABLE VACUUM TUBE
Filed Feb. 18, 1939　　　3 Sheets-Sheet 1

INVENTOR
CHARLES V. LITTON
BY
ATTORNEY

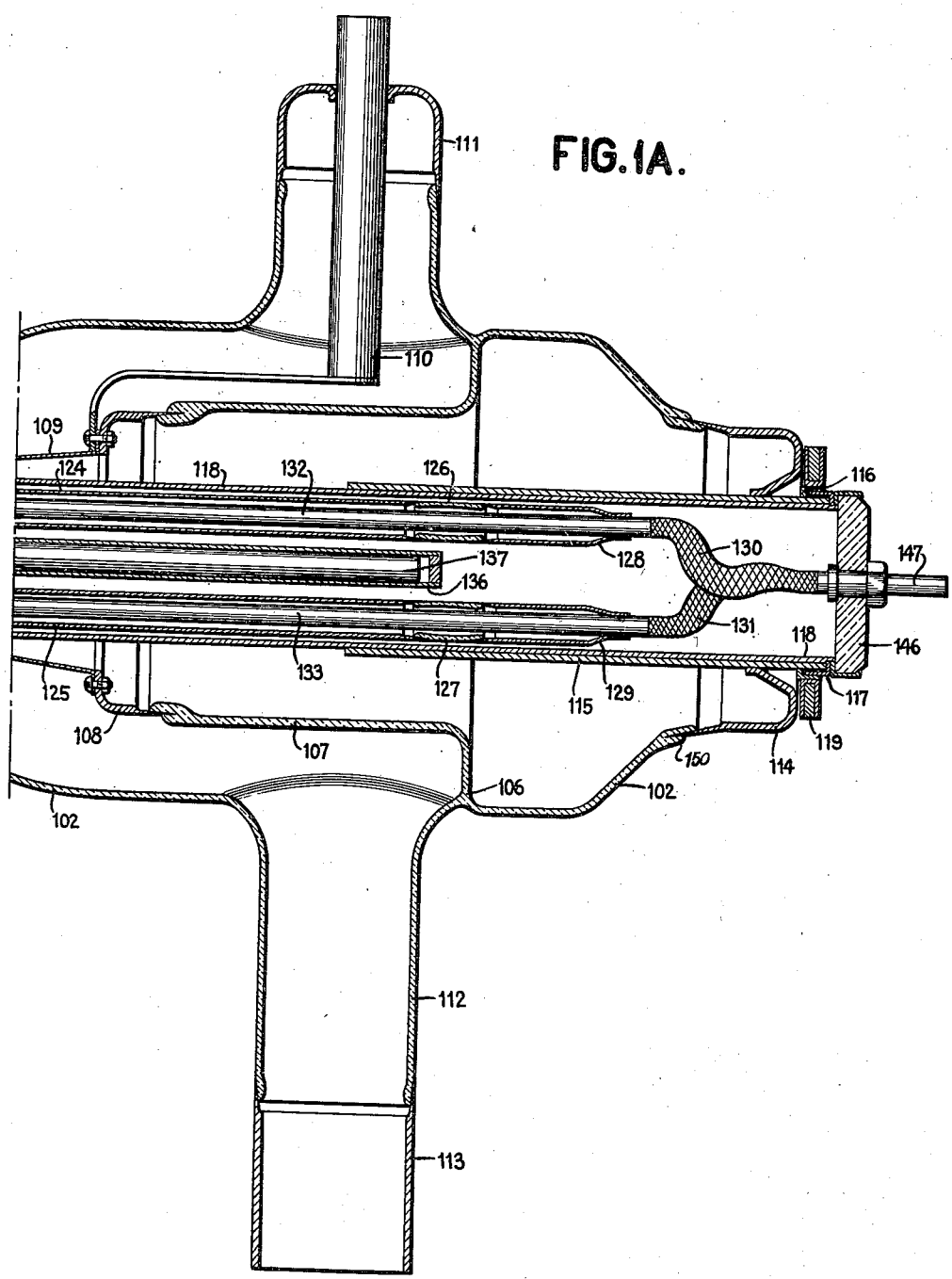

Jan. 28, 1941.   C. V. LITTON   2,229,751
DEMOUNTABLE VACUUM TUBE
Filed Feb. 18, 1939   3 Sheets-Sheet 3
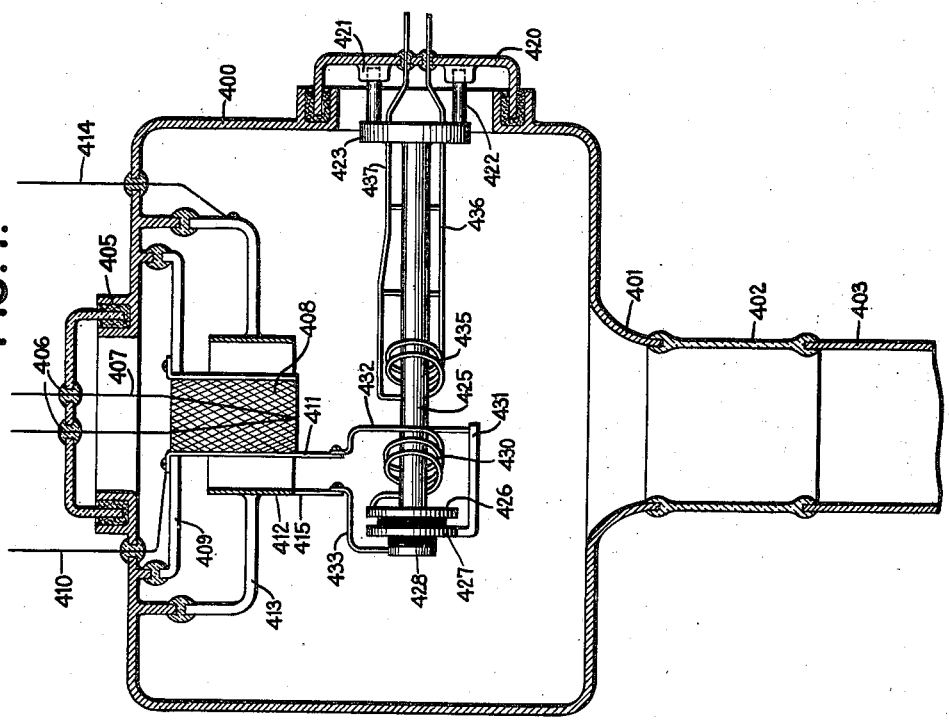
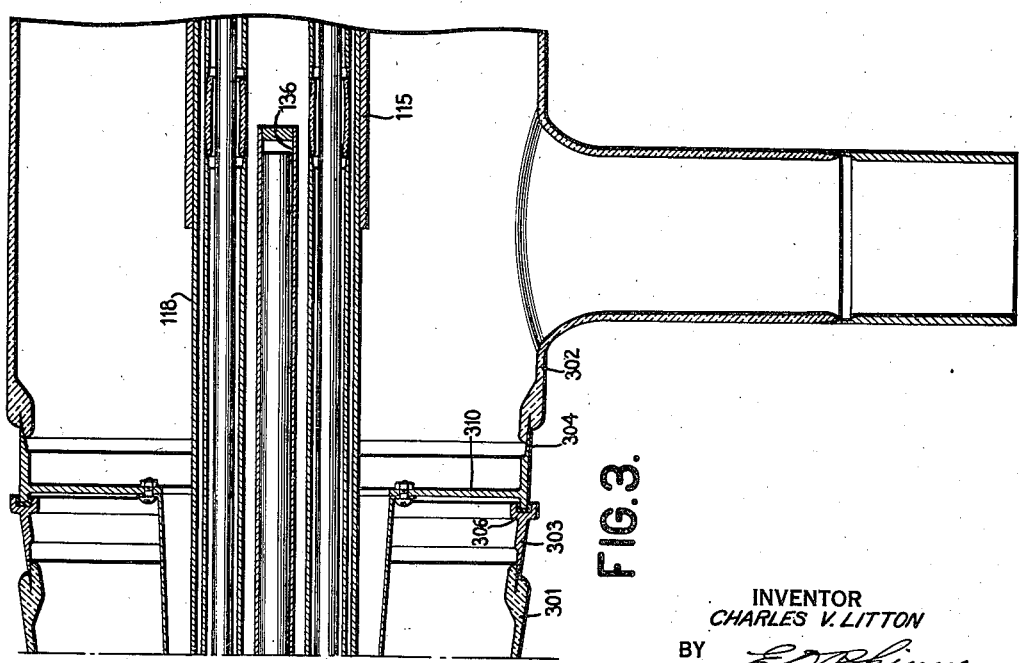
INVENTOR
*CHARLES V. LITTON*
BY
*E. D. Phinney*
ATTORNEY Patented Jan. 28, 1941

2,229,751

UNITED STATES PATENT OFFICE 2,229,751

DEMOUNTABLE VACUUM TUBE

Charles V. Litton, Redwood City, Calif., assignor to Mackay Radio and Telegraph Company, New York, N. Y., a corporation of Delaware Application February 18, 1939, Serial No. 257,072

10 Claims. (Cl. 250—27.5)

My invention relates to vacuum tubes and more particularly to tubes of the type in which the various structural parts of the tube may be removed for replacement by new parts.

Power vacuum tubes are generally quite expensive to construct and therefore costly to replace. However, because of the high operating voltages and currents certain elements of these tubes are liable to break down. It is therefore desirable to make such tubes of parts assembled in a manner so that any damaged element may be removed and replaced with a new element without necessitating a complete reconstruction of the entire tube. These tubes are generally known as demountable tubes.

Demountable tubes are generally designed for connection to a vacuum pump so that they are continuously being exhausted of gases during operation. This is desirable since otherwise the tube would have to be newly exhausted and sealed every time an element was replaced, thus in a large measure, destroying the usefulness of the demountable features.

My invention features demountable tubes and arrangements for removing the tube elements with a minimum amount of trouble.

The demountable tube construction may be applied to other elements than regular tube elements, in accordance with another feature of my invention. This feature is very useful, particularly for ultra-short wave operation, since it enables the operating circuits to be removably mounted within the tube envelope with small spacing from the tube electrodes.

It is an object of my invention to provide a tube of the demountable type which is adapted for convenient demounting and replacing of elements.

It is a further object of my invention to provide a tube circuit arrangement which may be demountably assembled within the vacuum tube envelope.

It is a further object of my invention to provide a demountable tube in which parts which need replacing may be removed and replaced without removing the tube from its mounted position. This may be accomplished by the use of what I term cup type soft solder joints.

A heating element may be built into the tube or other vacuum structure for softening the solder, and it is a further object of my invention to provide a vacuum structure with such an arrangement.

It is a still further object of my invention to provide a self-supporting grid structure particularly suited for use in a demountable tube, since it is built so as to be readily replaceable.

Figure 2:
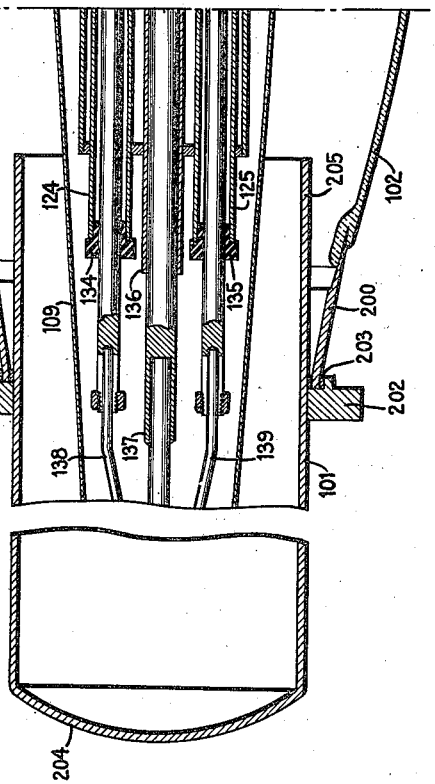

Other objects and advantages of my invention will be apparent from the particular description of my invention made with reference to the accompanying drawings, in which Figs. 1 and 1A illustrate a vacuum tube in accordance with my invention, Fig. 2 illustrates a modification of certain parts of the vacuum tube structure, Fig. 3 illustrates a further modification of the vacuum tube arrangement, and Fig. 4 illustrates a vacuum tube construction in which circuit elements are demountably assembled in the tube envelope.

The tube illustrated in Figs. 1 and 1A may be a power tube of the type often provided with water cooling. This tube is provided with an anode 100, which is flared at 101 for a metal-to-glass seal with the glass envelope 102. Anode 100 is preferably made of copper and the glass envelope 102 of hard glass, for example, glass known under the trade-mark name "Nonex." The other end of anode 100 is recessed slightly, as indicated at 103, and a metallic dome 104 is soft soldered into place for closing the end of the tube. Grid 105 is supported from a ring seal 106 intermediate the length of the envelope 102 by means of a glass cup 107. To this cup is sealed a metal ring 108, preferably of copper, to which grid 105 is fastened by means of metal cone 109 preferably of sheet nickel. The base of this conical member where it is fastened to ring 108 is made slightly smaller than the inner diameter of anode 100, so that grids may be removed or replaced through the anode upon removal of the dome shaped cap 104.

Grid 105 is made of wires spot welded into a mesh latticed form. This form of grid has certain advantages which should be mentioned. First, the spacing of the grid wires, and therefore the amplification factor of the tube, may be altered during fabrication by the simple expedient of changing the angle of intersection of the grid wires. Second, the wires may be welded together in groups by having the spot welding electrodes made in a form of a semi-circular block. For a power tube of about 50 kw. output, the grid wires may, for example, comprise .016" tantalum wire spot welded at each intersection.

The grid lead wire 110 extends through a copper cup 111 fastened to the envelope 102 by a metal-to-glass seal forming a protrusion known as a grid horn. Directly opposite the grid horn is provided a glass tube 112 and at the end of this tube is fitted another metal tube 113, for example of copper, which may be used for connecting the tube to a high speed pumping assembly. The glass envelope serves to insulate the tube assembly from the pump so that several tubes may be connected to the same pump if desired.

The cathode assembly is fabricated entirely of metal and at the point where it joins the envelope I provide another copper-to-glass seal 150 for connecting the part 114. Part 114 is firmly fastened preferably by brazing to a tube 115, preferably of steel, which acts as a guide for the cathode stem at the time the tube is assembled. This tube 115 extends outwardly beyond 114 and to it is firmly attached the annular cup 116. This cup cooperates with an inwardly extending flange 117 which is attached to the cathode stem 118. Thus when the cup is filled with soft solder after the parts have been properly tinned, a vacuum tight joint which is readily removable by application of heat is formed.

In order that the cathode stem assembly may be readily detached without the use of external flame, I provide a heating unit 119 built around the cup assembly so that interchange of elements may be effected merely by plugging in the heating unit 119 to the available voltage sources for melting the solder for ready removal.

Since in any power tube the cathode is less rugged than the other parts of the system and needs replacing quite often, it is desirable that this part be made so as to be easily removable. However, the structure must also be mechanically rugged so as to maintain the proper tube characteristics. Furthermore, the cathode unit should be a poor conductor of heat in order to withstand a large range of temperature, must provide for large radio frequency current carrying capacity, should be simple and cheap to construct and should properly be provided with a tensioning means for the filament. These design requirements have been met in the present structure. Cylinder 118 is made preferably of ferrous alloy or similar metal having relatively poor heat conductivity and is preferably rather thin to further decrease its conductivity. A suitable thickness is about $\frac{1}{32}$ of an inch. Cylindrical member 118 is closed at its remote end, except for the three holes indicated at 121, 122 and 123. Metallic tubes 124, 125 are brazed into holes 121 and 123, respectively, and act as supports for the filament lead assembly. Metal-to-glass seals 126 and 127 insulatingly support metal cups 128, 129, which are attached to the flexible leads 130, 131, and inwardly to rods 132, 133, conveniently made of copper. Ceramic sleeves 134, 135, space rods 132, 133 from tubes 124 and 125 and maintain the rigidity of the cathode assembly.

A metallic tube 136, closed at one end, is brazed in hole 122. This tube serves as a guide for cathode support rod 137 which slidably engages the bore of tube 136. Rods 132, 133 are bored for a short distance in their ends and in these recesses are supported, preferably by clamping, rods 138, 139. These rods are made of refractory metal such as molybdenum and to their other ends are fastened the ends of filament 140. The ends of filament 140 are fastened by welding or binding to rods 138, 139. The filament may be removed simply by loosening the clamp 142, 143 and replacing the filament and rods 138, 139. The far end of rod 137 is provided with a hook 144 over which the filament 140 is looped. Since in normal operation the tube will be mounted so that it hangs downwardly, the weight of rod 137 serves to maintain tension on the filament. A shielding member 145 of tantalum or other suitable metal may be provided on the end of grid 105 to serve as a shield. The end of tube 118 may be closed by means of an insulating disc 146, preferably of ceramic material and clamping means 147 are provided for the flexible leads to prevent them from coming into contact with the walls of the outer cylinder 118 and also to prevent strains on the glass seal 126, 127.

In Fig. 2 is shown an alternative design for the tube structure. Reference characters applied to Fig. 2 corresponding to those shown in Figs. 1 and 1A, are the same. In this structure instead of flaring the anode 101, I provide a short copper tube 200 which is larger in diameter than anode 101. The tube 200 is sealed to the envelope 102. Brazed to anode 101 is provided a ring 202 which may be a part of the flange used to hold the tube in its water jacket. In ring 202 is provided a cup-like recess 203 which may be used for providing a soft solder joint similar to the cup-type joint shown at 116 in Fig. 1A. This construction enables the entire anode to be removed and thus simplifies the removal of the grid structure. Furthermore, it permits the use of a drawn anode with one end permanently sealed, as shown at 204. It also permits the anode to extend downwardly in the envelope beyond the copper glass seal, as shown at 205, and thereby provides an electrical shield for the seal without the addition of extra parts. This arrangement, furthermore, provides a less expensive replacement program, since either the anode or the envelope may be replaced individually.

A further alternative design is shown in Fig. 3. This alternative design may be used in connection with either of the first or second modification already described. In this arrangement the envelope is made in two parts as indicated at 301, 302, and the grid supporting cup and ring seal, as well as the grid horn, may be entirely eliminated. Two copper rings 303, 304 are provided, ring 303 being provided with cup-shaped receptacle 306, to which ring 304 may be attached by soft soldering as explained above. Extending inwardly from 304 is provided the grid supporting ring 310. This construction provides additional ease in demounting the tube and also provides an adequate electrical connection to the grid without the necessity of a separate grid lead and grid horn. The lower ring 303 which includes a cup 306 for the soft soldering is preferably provided with a heater similar to that shown at 119, Fig. 1A, so that no flame is necessary to take apart the joint. This construction, while it has additional metal glass seals, results in a simplification of the structure and still further breaks down the size of interchangeable parts.

A further application of the demountable tube structure is indicated in Fig. 4. In ultra-high frequency work most of the tube elements and circuits should be closely associated. Likewise, the elements should be as compact as possible to cut down stray capacities, radiation losses and excessive inductance. In Fig. 4, I illustrate a tube with a metallic envelope 400. This envelope is provided with a connection tube 401 for coupling it to a vacuum pump, preferably by means of a metal glass seal 402, 403, so that the tube will be insulated from the pump. The cathode may be supported by means of a cup-type soft solder joint similar to that illustrated in Figs. 1 and 1A. The filament leads are brought out through glass beads 406. Surrounding the filament 407, I provide a grid 408 removably fastened by means of screws on brackets 409, insulated from the envelope 400. Fastened to the grid is provided grid lead 410 which is brought outside the element through a glass bead. Grid 408 is provided with an extension 411, the purpose of which will be described later. Anode 412 is mounted outside grid 408 on an insulated bracket 413 and is provided with an external anode supply lead 414. Anode 412 is also furnished with an extension portion 415, the use of which will be described later.

A circuit arrangement for coupling to the tube is mounted on another cup-type soldered joint 420. The metal cup 420 is provided with a raised ring portion 421 in which are mounted supporting rods 422 which support an insulating disc 423. To this disc 423 is fastened a rod 425 of insulating material. For these parts, insulation of any suitable form may be used, e. g. that known under the trade name of "Isolantite." Mounted on the end of rod 425 is a three-plate condenser composed of plates 426, 427 and 428, each of these plates being isolated from one another by insulating material. Wound on rod 425 is a coil 430, one end of which is fastened directly to plate 426, the other end being fastened by lead 431 to the other end of the coil 430, to form an oscillating tank circuit. A flexible lead 432 is connected to one end of coil 430, another flexible lead 433 is connected to the small condenser plate 428 to prevent direct conductive connection between the grid and anode. Lead 432 is fastened to extension 411 on grid 408 and lead 433 is fastened on extension 415 of anode 412. Mounted on rod 425 in coupling relation with coil 430 is energy pick-up coil 435. Leads 436, 437 extend back along rod 435 and through holes in disc 423 and glass beads in cap member 420 are brought to the outside of the tube for external use. It is clear that the structure described above provides an oscillating circuit completely inside of envelope 400, in which the tank circuit and pick-up coil may be mounted at a point adjacent the anode and grid electrode of the vacuum tube. The distributed capacity between the filament and the grid and plate, completes the circuit for producing oscillations when suitable supply voltages are applied to the anode filament and grid lead. If it is desired to change the frequency at which the circuit oscillates the solder around cup 420 may be melted and this cup removed, and the whole element replaced by a circuit tuned to a different frequency.

It is clear that other forms of circuits may be made by utilizing my invention in order to rotate the circuit elements close together and close to the tube elements.

It should be distinctly understood that other modifications of my invention may be made within the scope of the disclosure and the particular description made herein is not intended as a limitation of the invention. In every case wherein soft type solder joints are provided, built in heating means may also be furnished, as described. What I consider as my invention and upon which I desire protection is embodied in the accompanying claims.

What I claim is:

1. A vacuum tube comprising an envelope having an opening therein, a closure member, means for mounting an electrode element of said tube on said member, solder fastening said closure member to said envelope to form a gas tight seal over said opening, and a heating unit mounted on said envelope about said opening for melting said solder to provide for removal and replacement of said closure member.

2. A gas tight enclosure comprising a body having an opening therein, a metallic member forming an annular cup about said opening, a closure member having a ring portion fitting into said cup, and solder in said cup forming a gas tight joint between said body and said closure.

3. A vacuum tube comprising an envelope having an opening therein at one end and a hollow metallic anode sealed thereto at the other end, a metallic member having an annular cup shaped portion sealed to said envelope about said opening, a closure member carrying said removable elements extending into said hollow anode, said closure member having a metallic ring portion fitting into said annular cup and solder in said cup forming a gas tight joint between said envelope and said closure member.

4. A vacuum tube comprising an envelope having an opening therein at one end and a hollow metallic anode sealed to the other end, a metallic member having an annular cup shaped portion sealed to said envelope about said opening, a closure member carrying said removable elements extending into said anode, said closure member having a metallic ring portion fitting into said annular cup, solder in said cup forming a gas tight joint between said envelope and said closure member, and a heater mounted on said metallic member outside said annular cup for melting said solder for removing said element from said tube.

5. A demountable vacuum tube comprising an envelope having an opening therein at one end and a hollow metallic anode sealed to the other end, means for exhausting gas from said envelope, a metallic member having an annular cup shaped portion sealed to said envelope about said opening, a closure member carrying said removable elements, said closure member having a metallic ring portion fitting into said annular cup and solder in said cup forming a gas tight joint between said envelope and said closure member.

6. A demountable tube comprising a glass envelope, a metallic anode sealed to said envelope, a hollow grid electrode removably secured to said envelope, extending into said anode, a removable member soft soldered to said anode for closing an opening through which said grid electrode may be removed, a cathode positioning member sealed about an opening in said envelope, an annular solder supporting cup on said member outside said envelope, a closure member having a metallic ring portion fitting into said annular cup, solder in said cup forming a gas tight joint between said closure member and said envelope, cathode carrying means extending into said envelope and cooperating with said cathode positioning means, and a removable filament mounted on said cathode carrying means within the hollow of said grid electrode.

7. A demountable tube according to claim 6, further comprising an electrical heating unit mounted on said cathode positioning member adjacent said annular cup, to melt said solder for removing and replacing said closure member.

8. A demountable tube comprising a glass envelope, an anode sealed to said envelope, a cathode positioning member sealed about an opening in said envelope opposite said anode, an annular solder supporting cup on said member outside said envelope, a closure member having a metallic ring portion fitting into said annular cup, solder in said cup forming a gas tight joint between said closure member and said envelope, cathode carrying means extending into said envelope and cooperating with said cathode positioning means to position said cathode centrally of said anode, and a removable filament mounted on said cathode carrying means within the hollow of said grid electrode.

9. A demountable tube comprising an envelope of insulating material, divided into two parts, a metal ring member provided with an annular cup sealed to one of said parts, a second metal ring member fitted into said annular cup sealed to said other envelope part, soft solder in said cup forming a gas tight seal between said first and second rings, and an electrode supporting member fastened to one of said rings interiorly of said envelope.

10. A demountable tube according to claim 9, further comprising an electrical heating unit mounted on said first ring adjacent said annular cup to melt said solder for separating and rejoining said envelope parts.

CHARLES V. LITTON.